(12) United States Patent
Vargas et al.

(10) Patent No.: US 10,636,266 B2
(45) Date of Patent: *Apr. 28, 2020

(54) SMART PRODUCT LABEL PLATFORM

(71) Applicant: Avery Dennison Retail Information Services, LLC, Mentor, OH (US)

(72) Inventors: Julie Vargas, San Antonio, TX (US); Kimberly Kae Schneider, Las Vegas, NV (US); Christopher Palmer, Norway, ME (US); Paul A. Chamandy, Skaneateles, NY (US)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/343,584

(22) Filed: Nov. 4, 2016

(65) Prior Publication Data
US 2017/0132892 A1 May 11, 2017

Related U.S. Application Data

(60) Provisional application No. 62/251,933, filed on Nov. 6, 2015.

(51) Int. Cl.
*G08B 13/24* (2006.01)
*G06K 17/00* (2006.01)
*G06K 19/06* (2006.01)
*G06K 19/077* (2006.01)
*G06K 19/07* (2006.01)

(52) U.S. Cl.
CPC ........ *G08B 13/2451* (2013.01); *G06K 17/00* (2013.01); *G06K 19/06009* (2013.01); *G06K 19/0723* (2013.01); *G06K 19/07758* (2013.01)

(58) Field of Classification Search
CPC .................................................. G08B 13/2451
See application file for complete search history.

(56) References Cited

U.S. PATENT DOCUMENTS 6,956,472 B1  10/2005  Walcott, Jr. et al.
2012/0062367 A1  3/2012  Warther
(Continued)

OTHER PUBLICATIONS international Serach Report and Written Opinion prepared for PCT/US2016/060504 dated Jan. 17, 2017.

*Primary Examiner* — Travis R Hunnings
(74) *Attorney, Agent, or Firm* — Avery Dennison Retail Information Services, LLC

(57) ABSTRACT

A tag or label incorporating embedded trigger technology, such as RFID, QR codes, or barcodes is disclosed to effectively integrate RFID or a trigger directly into the garment. Typically, the embedded technology is embedded via a digital manufacturing process, and the labels and tags enable a data connection via the embedded triggers and a unique identifier corresponding to the embedded triggers. Thus, once the trigger technology is enabled via scanning, visual recognition, UHF/NFC RFID, etc., data items in the data management platform are enabled. Specifically, the data items within the data management platform include sustainability, consumer engagement, authentication/brand protection, merchandising/marketing, and data management and can be leveraged to drive an interactive consumer experience.

13 Claims, 10 Drawing Sheets

(56) References Cited

U.S. PATENT DOCUMENTS

| | | | |
|---|---|---|---|
| 2013/0059534 A1* | 3/2013 | Sobalvarro | G06Q 30/02 455/41.1 |
| 2014/0108289 A1* | 4/2014 | Eitan | G06Q 50/01 705/342 |
| 2014/0124582 A1* | 5/2014 | Kroener | G06K 19/07745 235/487 |
| 2014/0263659 A1 | 9/2014 | Kervinen et al. | |
| 2014/0379532 A1* | 12/2014 | Agasti | G06Q 30/0643 705/27.1 |
| 2015/0188227 A1* | 7/2015 | Schaefer | H01Q 7/06 343/720 |
| 2016/0189018 A1* | 6/2016 | Duckett | G06K 7/10198 340/10.51 |
| 2016/0253732 A1* | 9/2016 | Brown | G06Q 10/00 235/462.11 |

* cited by examiner

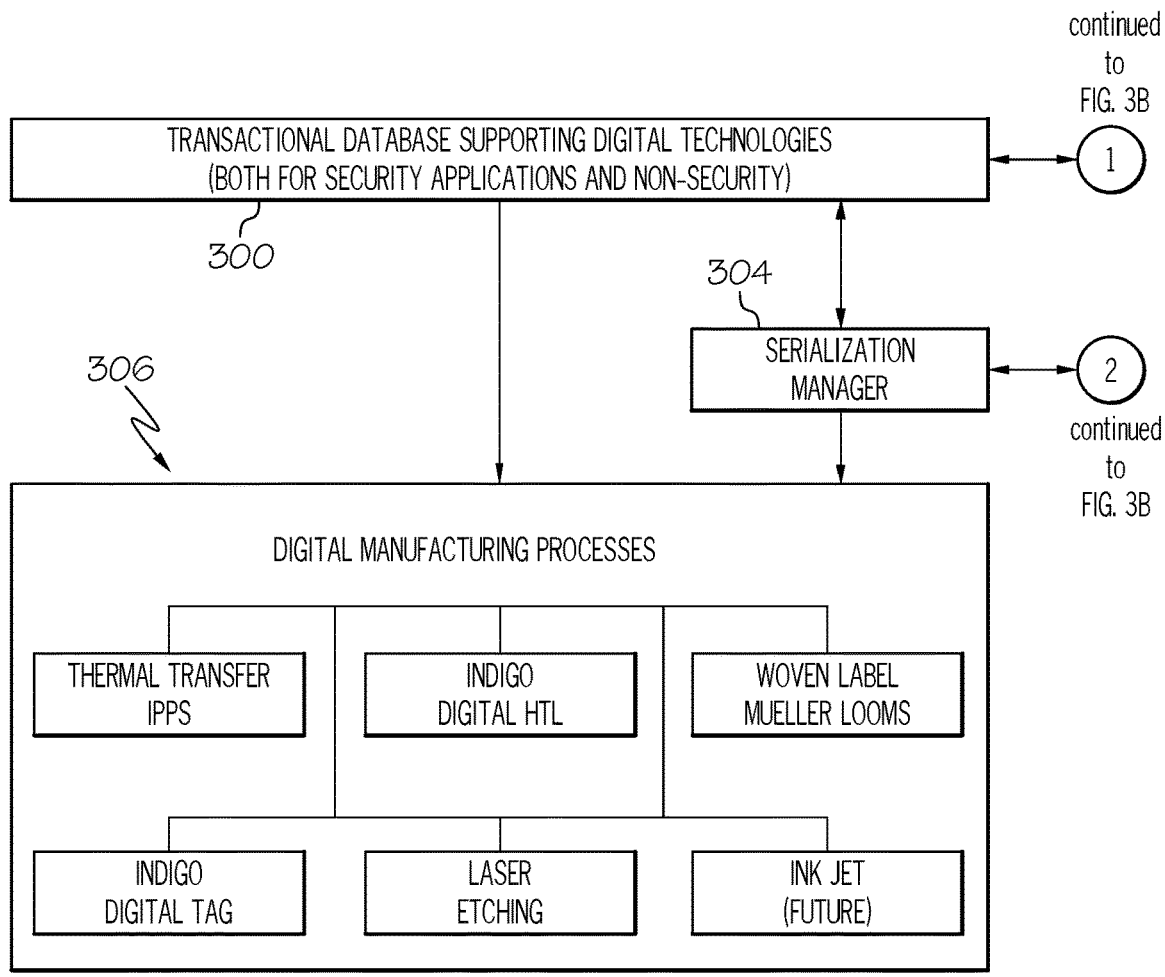

- PROVIDES DATA FOR PRODUCTS NOT PRODUCED DIGITALLY BUT NEEDED FOR VENDOR MONITORING AND COMPLIANCE TOOL

- MANAGES SERIALIZTION FOR SECURITY FOR ALL DIGITAL PROCESSES

- NON-SECURITY DIGITAL PROCESSES BYPASS SERIALIZATION MANAGER

- UPDATES DATABASE WITH ACTUAL DATA AND SERIAL #S PRINTED

- PROVIDES THE STRUCTURE TO ALLOW ADDRESSING AND APPENDING DATABASE RECORDS TO INCLUDE APPLICATION SPECIFIC FUNCTIONALITY

- APPLICATIONS WILL REQUIRE SUFFICIENT BANDWIDTH (GLOBALLY) TO ALLOW FOR A LARGE NUMBER OF USERS AT ANY ONE TIME AND MUST SUPPORT EXTENDED TRAFFIC BASED ON NUMBER OF USERS AND GROWTH OF UNDEFINED SDK DEVELOPED APPLICATIONS

FIG. 3A

SMART PRODUCT LABEL PLATFORM

CROSS REFERENCE TO RELATED APPLICATIONS

The present application claims priority to and the benefit of U.S. Provisional Application No. 62/251,933 filed Nov. 6, 2015, which is incorporated by herein by reference in its entirety.

BACKGROUND

The present invention relates generally to the addition of a radio-frequency identification (RFID) transponder or other embedded trigger technology within a sewn-in label. The addition of the RFID transponder effectively integrates RFID directly into a garment. The present subject matter is especially suitable for clothing and accessories. Accordingly, the present specification makes specific reference thereto. However, it is to be appreciated that aspects of the present inventive subject matter are also equally amenable to other like applications.

Radio-frequency identification ("RFID") is the use of electromagnetic energy ("EM energy") to stimulate a responsive device (known as an RFID "tag" or transponder) to identify itself and in some cases, provide additionally stored data. RFID tags typically include a semiconductor device commonly called the "chip" on which are formed a memory and operating circuitry, which is connected to an antenna. Typically, RFID tags act as transponders, providing information stored in the chip memory in response to a radio frequency ("RE") interrogation signal received from a reader, also referred to as an interrogator.

RFID tags may be incorporated into or attached to articles to be tracked. In some cases, the tag may be attached to the outside of an article and in other cases, the tag may be inserted within the article, such as being included in the packaging, located within the container of the article, or sewn into a garment. The RFID tags are manufactured with a unique identification number which is typically a simple serial number of a few bytes with a check digit attached. This identification number is incorporated into the tag during manufacture. The user cannot alter this serial/identification number and manufacturers guarantee that each serial number is used only once. The RFID tag is read-only and it responds to an interrogation signal only with its identification number. Such read-only RFID tags typically are permanently attached to an article to be tracked and, once attached, the serial number of the tag is associated with its host article in a computer data base.

However, hang tags, care labels, and other manufacturing labels are typically a ticket, tag, or sticker attached to the exterior of the garment. These tags may become detached with rough handling, or deliberately removed. Further, typical care labels are required to contain a large amount of information, including a plurality of language translations due to custom requirements. Thus, it has become increasingly difficult to fit all of this information on a care label or hang tag, and additionally the care labels/hang tags have become larger in order to fit the large amount of information.

What is needed therefore is a sewn-in label, with an RFID transponder within it, or other embedded trigger technology. Thus, the RFID transponder can be equipped with a large amount of information to enable tracking and loss prevention, as well as to access care instructions and language translations, all without increasing the size of the hang tag or care label.

The present invention discloses a sewn-in label with an RFID transponder or other embedded trigger technology within it. The RFID transponder or other embedded trigger technology allows the care label or hang tag to be equipped with a large amount of information, which is stored in a database. The database and information is equipped with a digital reference to a large amount of information, including care instructions and language translations, without increasing the overall size of the hang tag/care label. The RFID transponder or embedded trigger technology can also provide loss prevention and enable tracking as well as promotes other actions to heighten the consumer experience.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a tag or label incorporating embedded trigger technology, such as RFID, QR codes, Data Matrix codes, barcodes, etc. Typically, the embedded trigger technology is embedded via a digital manufacturing process, such as thermal transfer IPPS, indigo digital HTL, woven label (Mueller Looms), Indigo digital tag, laser etching, and ink jet, etc. The care labels and hang tags enable a data connection via the embedded triggers. Specifically, the garments or accessories with the care labels and hang tags comprise corresponding unique identifiers which are triggered by the embedded technology. The unique identifiers enable the data items stored in a data management platform. The data management platform controls the chain of custody and also comprises the business rules engine. The business rules engine identifies rules to determine which data item to select. For example, the data items comprise brand catalogue, factory e-commerce, content delivery, serialization engine, track and trace events, and other inbound/outbound data. After product integration, the inbound/outbound data can be recalled by an end user through the trigger based on security credentials and business rules and logic. The other inbound/outbound data is sent to a secure black box which then communicates with external printers.

In a preferred embodiment, the disclosed system and method is designed to elevate brands and accelerate performance throughout the global supply chain. The system can elevate brands by providing tickets, labels, and hang-tags with anti-counterfeit and security labels, brand embellishments, and sustainable packaging solutions. The system can accelerate performance by providing global compliance, brand protection, and inventory accuracy and loss prevention.

An RFID transponder or other embedded trigger technology is incorporated into a care label or hang tag to effectively integrate RFID directly into the garment or accessory. The RFID transponder or embedded trigger technology generates a unique identifier for the garment or accessory which enables data items within the data management platform. Thus, once the trigger technology is enabled via scanning, visual recognition, UHF/NFC RFID, etc., items in the data management platform are enabled. Specifically, the items within the data management platform include sustainability, consumer engagement, authentication/brand protection, merchandising/marketing, and data management.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 3A and FIG. 3B illustrate a flowchart of the transactional database of the disclosed system in accordance with the disclosed architecture.

DETAILED DESCRIPTION

Figure 1:
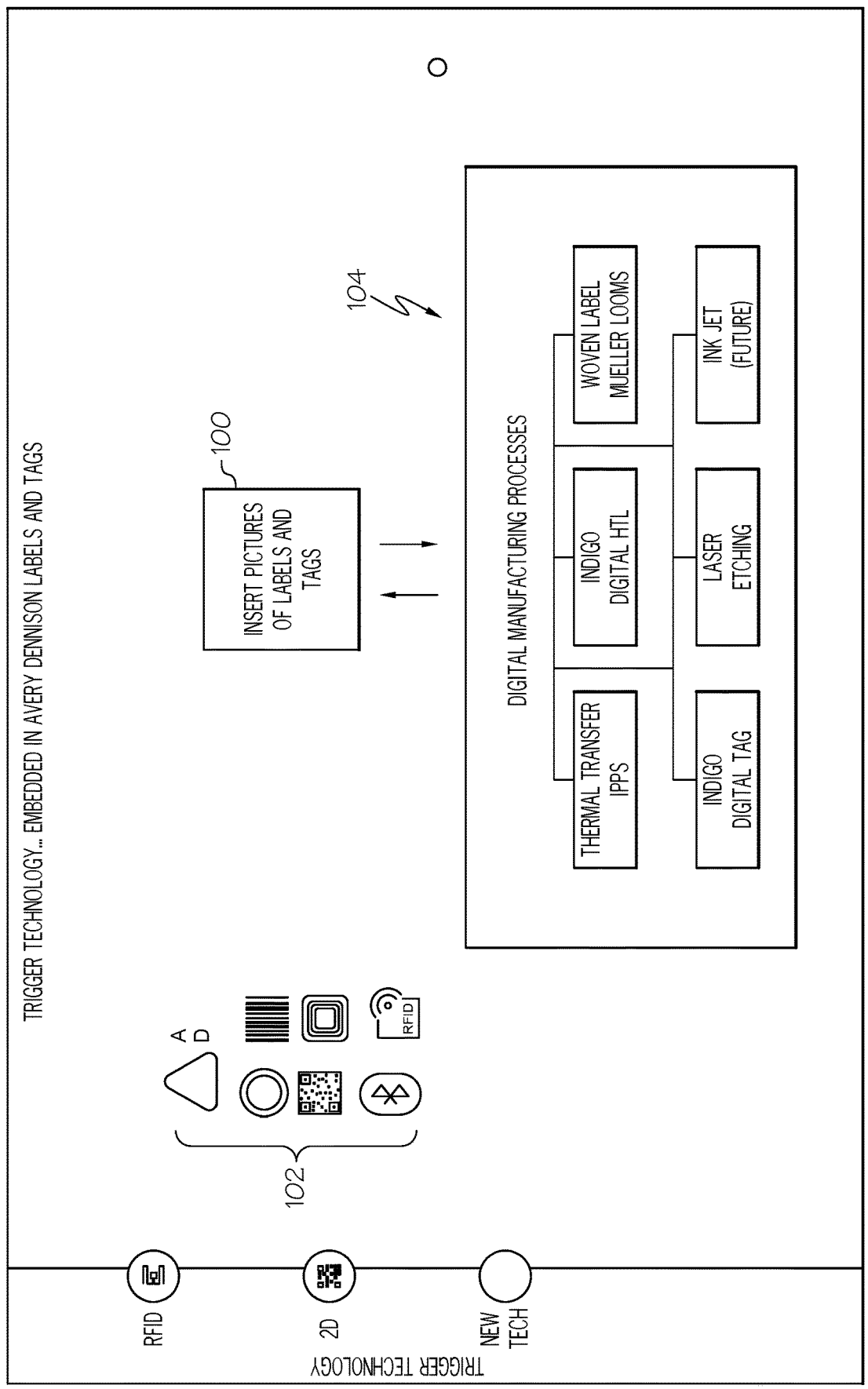
FIG. 1 illustrates a flowchart of the embedded trigger technology of the disclosed system in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a tag or label incorporating embedded trigger technology, such as RFID, QR codes, or barcodes to effectively integrate RFID directly into the garment. Typically, the embedded technology is embedded via a digital manufacturing process, and the labels and tags enable a data connection via the embedded triggers and a unique identifier corresponding to the embedded triggers. Thus, once the trigger technology is enabled via scanning, visual recognition, UHF/NFC RFID, etc., data items in the data management platform are enabled. Specifically, the data items within the data management platform include sustainability, consumer engagement, authentication/brand protection, merchandising/marketing, and data management.

Figure 2:
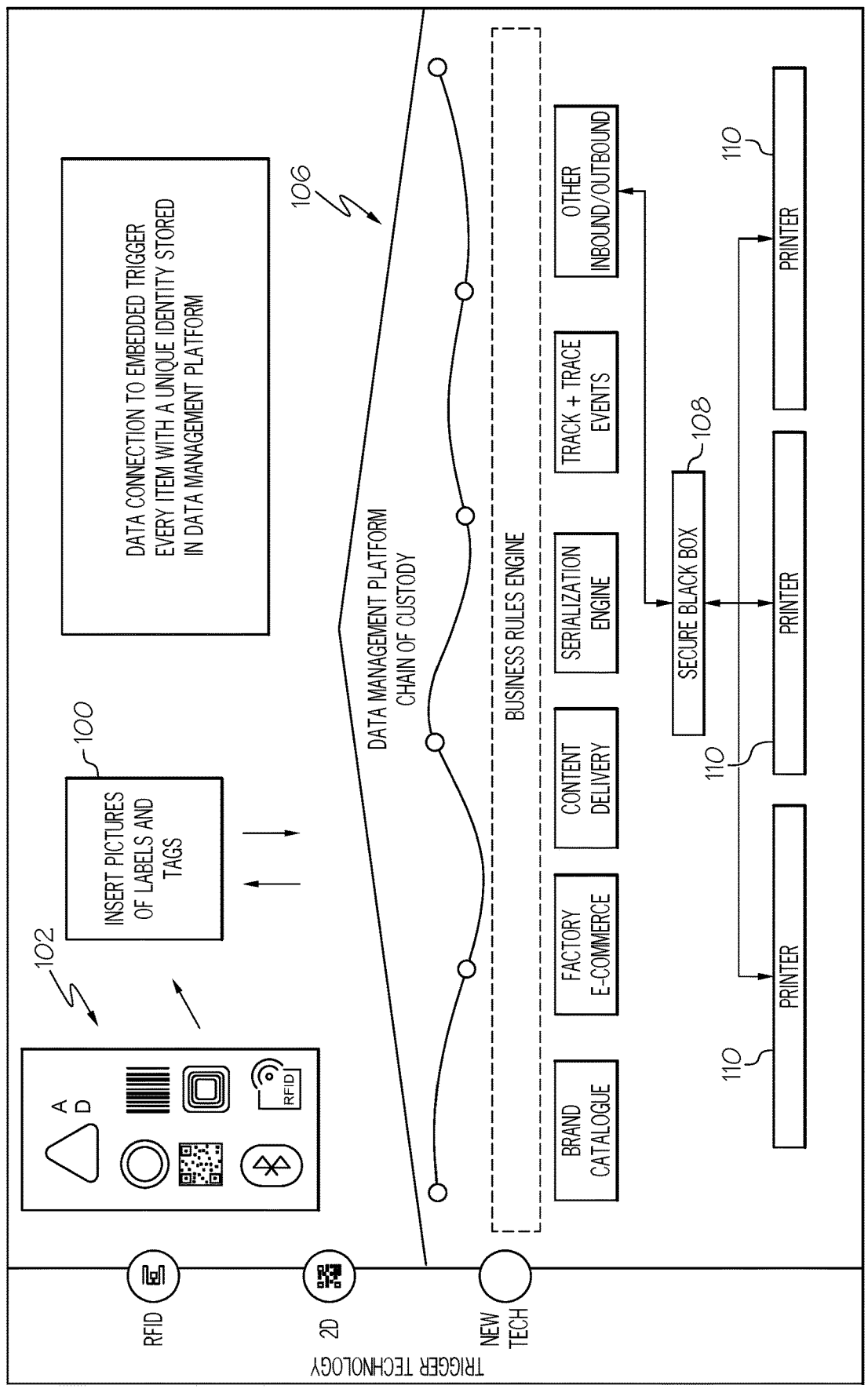
FIG. 2 illustrates a flowchart of the data connection to the embedded trigger technology of the disclosed system in accordance with the disclosed architecture.

Referring initially to the drawings, FIGS. 1-2 illustrate the tag or label 100 incorporating embedded trigger technology 102, such as RFID, QR codes, barcodes, etc. Typically, the embedded technology 102 is embedded via a digital manufacturing process 104, such as thermal transfer IPPS, indigo digital HTL, woven label (Mueller Looms), Indigo digital tag, laser etching, and ink jet, etc. The labels and tags 100 enable a data connection via the embedded triggers 102 and a unique identifier corresponding to the embedded triggers. Specifically, data items stored in a data management platform 106 are enabled via the unique identifiers and embedded trigger technology. The data management platform 106 controls the chain of custody and also comprises the business rules engine. The business rules engine identifies rules to determine which data item to select. The data items comprise brand catalogue, factory e-commerce, content delivery, serialization engine, track and trace events, and other inbound/outbound data. The other inbound/outbound data is sent to a secure black box 108 which then communicates with external printers 110.

Figure 3B:
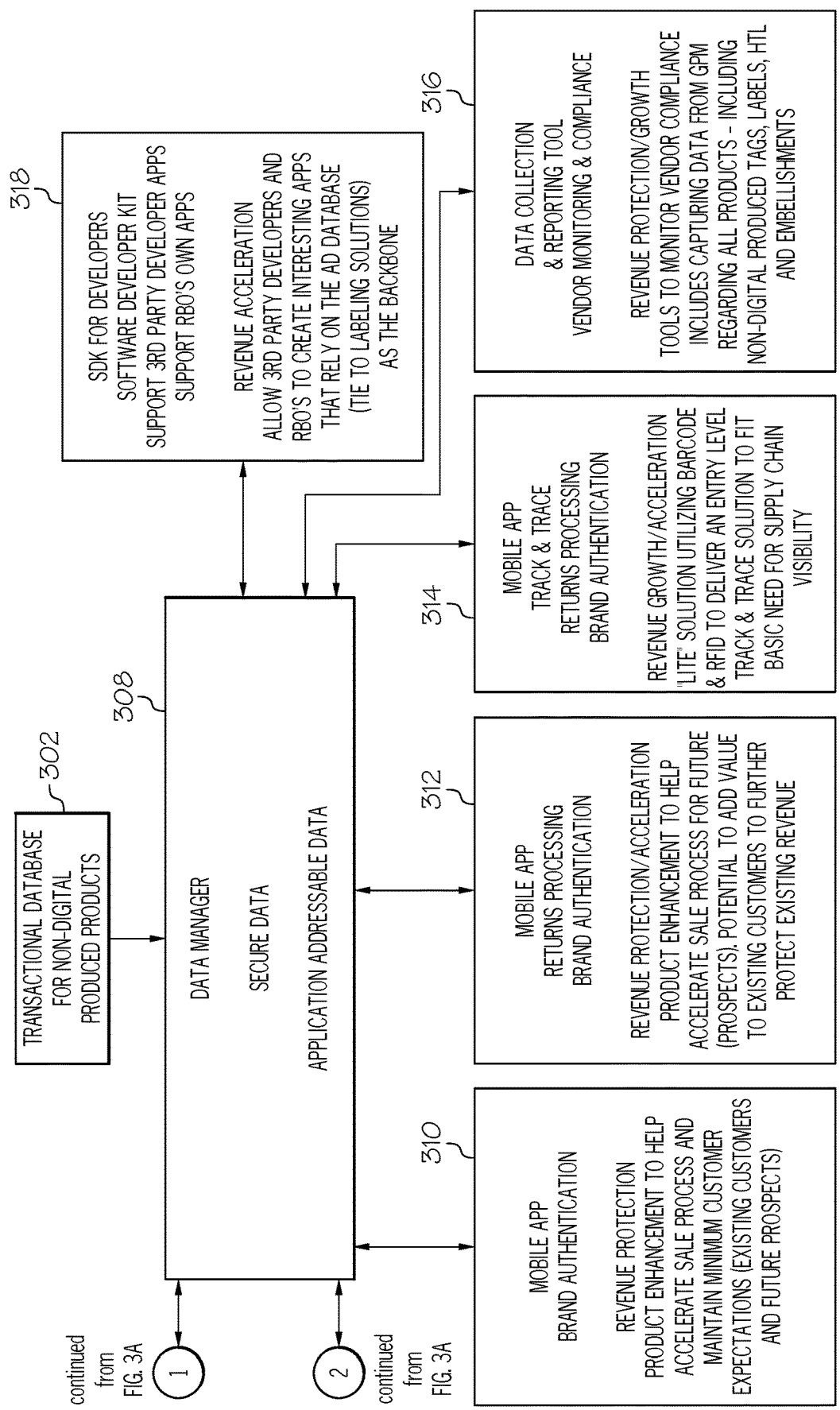

As shown in FIG. 3, a transactional database 300 supporting digital technologies is used for both security applications and non-security. A transactional database for non-digital produced products 302 is also used. This provides data for products not produced digitally but needed for vendor monitoring and compliance tools. A serialization manager 304 manages serialization for security for all digital manufacturing processes 306, such as thermal transfer IPPS, Indigo digital HTL, woven label Mueller Looms, Indigo digital tag, laser etching, and ink jet (future process). The serialization manager 304 updates the database with actual data and serial numbers for the secure data. Non-security digital processes bypass the serialization manager 304 and goes straight to the digital manufacturing processes 306. The digital manufacturing processes 306 then updates the database with actual data and the serial numbers printed. The data manager 308 of the database then provides the structure to allow addressing and appending database records to include application specific functionality. Specifically, the application addressable data includes a mobile application for brand authentication 310, returns processing 312, and track and trace functions 314, as well as a data collection and reporting tool 316 and a software developer kit (SDK) for developers 318.

The applications will require sufficient bandwidth (globally) to allow for a large numbers of users at any one time and must support extended traffic based on the number of users and growth of undefined SDK developed applications. Specifically, the mobile application for brand authentication provides revenue protection. For example, the brand authentication mobile application would provide product enhancement to help accelerate sale processes and maintain minimum customer expectations (existing customers and future prospects). The returns processing mobile application would have the potential to add value to existing customers to further protect existing revenue. The track and trace mobile application produces a "lite" solution utilizing barcodes and RFID to deliver an entry level track and trace solution to fit the basic need for supply chain visibility. The data collection and reporting tool provides tools to monitor vendor compliance, including capturing data from global print management ("GPM") regarding all products, including non-digital produced tags, labels, HTL, and embellishments. The SDK for developers supports $3^{rd}$ party developer applications and supports RBO's own applications. This allows third party developers and RBO's to create interesting applications that rely on the AD database as the backbone.

Additionally, the disclosed system and method is designed to elevate brands and accelerate performance throughout the global supply chain. The system can elevate brands by providing tickets, labels, and hang-tags with anti-counterfeit and security labels, brand embellishments, and sustainable packaging solutions. The system can accelerate performance by providing global compliance, brand protection, and inventory accuracy and loss prevention. Global compliance provides centralized data management, legal compliance, translation guidance, and flexibility to print at a service bureau or in a factory. Brand protection provides overt and covert security technologies and product traceability and authentication. Inventory accuracy and loss prevention provides integrated RFID solutions from manufacturing to consumer, and increases speed, accuracy, visibility, and margins.

For example, care labels for garments and accessories require specific translations for clearing customs, as well as other regulatory compliance issues. A digital tag or label allows for the required amount of translations, as well as clearing customs and other regulatory compliance issues without crowded labels. The digital tag also provides social and environmental sustainability and responsible sourcing. The digital tag can also handle complex data requirements, last minute data updates, and secure transmissions. Further, the digital tag provides flexibility, speed, ease of ordering, durability, and brand alignment.

The disclosed system and method provides a range of tools and services to support global care labeling to enable users to deploy new programs in an effective and timely manner. These tools encompass guides on label design and construction, legal requirements, and foreign language translations of relevant words and phrases. The system also provides country legislation profiles, translation database capabilities, permanent or removable applications, label design and optimization, and innovation.

Country legislation profiles are provided for over 100 different countries, with key requirements by country and analysis of current labeling by country. The system also provides links to outside source information, and maintains and updates new and pending legislation.

Translation database capabilities include care labeling words and phrases in over 40 languages, as well as a third party translator for new phrases and languages, and provides a custom database for user's specific phrases and rules. Specifically, the global database would include care, content, country of origin, size, descriptors, and care symbol association (Ginetex, NAFTA, ISO, ASTM, Japanese, Korean, and Taiwan) for the garment or accessory.

Permanent applications comprise tracking information for returns and other metrics which remains with the garments. Some compliance requirements can be interpreted to have care information remain for life of garment, or user can have care instructions available at time of wash. Removable applications provide label aesthetics less of a design concern and eliminate label comfort issues.

Label design and optimization provides ways to get more information onto a small, consumer friendly label that is suitable for the garment, but still meets legislative demands without compromising legibility for the customer. The label design provides information placement by language and category, label layouts, and optimized care labeling via type, size, print quality, aesthetics, speed, and cost.

Innovation provides smart labels and QR codes. As smartphones become increasingly widespread, machine readable codes can be used to call up complex data originally printed on a large care label and subsequently cut out of the garment. Machine readable codes can be used to start a mobile customer experience related to loyalty, social media or product/brand education. QR codes can be serialized to give item level track and trace visibility for brand protection. Each QR code is assigned a unique number that corresponds to product and manufacturing information in an internal database. This provides brand owners with the ability to validate individual products throughout the supply chain. In addition to data management, the disclosed system also provides physical elements that can protect brands from counterfeit activity, diversion and other forms of intellectual property infringement, as well as allows the footprint to be moved to key apparel locations.

RFID care labels provide the addition of an RFID transponder to a sewn-in label which effectively integrates RFID directly into the garment. Whereas a ticket or sticker attached to the exterior of the garment may become detached with rough handling, a sewn-in RFID label stays with the garment unless deliberately removed. RFID care labels provide fast, accurate stock-checking in the store or DC, and can trigger a range of multimedia device to heighten the consumer experience. For example, a fashion item might trigger a video of the catwalk; sportswear might call up a simulated stadium environment; and in the changing room the consumer could be presented with suggested matching items or details of a garment's provenance. Even beyond these abilities, a permanently affixed RFID label has additional benefits for loss prevention purposes. For example, whereas a determined shoplifter might remove an external anti-theft tag, a sewn-in version is both less obvious and more difficult to remove without damaging the garment. Further, with the appropriate readers fitted at the store exit, RFID care labels can perform the function of the traditional EAS tag. Additionally, as RFID care labels enable garment tracking throughout the supply chain, the labels can also be used for inventory accuracy, as an anti-diversion device, and to prevent fraudulent returns to the retail store, as well as with big data: IoT (Internet of Things).

Sustainable care labels incorporate social compliance programs with audit standards and protocols that have been validated against global auditing standards (i.e., BV, BSCI, Higg, SA8000, SMETA, WRAP). The sustainable care labels also incorporate the ICAP program, which shares third party audits with selected customers, and promotes subcontractor auditing and raw material supplier audits. The care labels incorporate recycled polyester yarns for woven and printed fabric labels, as well as recycled and FSC certified paper stocks for stickers and hangtags and recycled fasteners. Specifically, the original printed fabric label with double sided, black satin tape (located at back neck): polyester (PET) yarn, dyed; is redesigned as the printed fabric label with double sided, white satin 724E tape (relocated to side seam): recycled polyester (PET), yarn, raw.

The focus on the disclosed system is on label optimization, wherein the new concept of a multi-panel label conveys a lot of information while preserving aesthetics and provides more choices. As the content increases, including the addition of languages and legislation requirements, the challenge is to get more information onto a small, consumer friendly label that is suitable for the garment, but still meets legislative demands without compromising legibility for the customer. The disclosed RFID label provides such an optimized label, with the focus on the care, content, and compliance of such labels.

The disclosed system also supports conventional wet ink printing as well as digital thermal production. Conventional wet ink printing involves an industrial printing press and calls for the use of a physical printing plate and a liquid (wet) ink. The actual printing is generally preceded by a number of prepress processes such as typesetting and platemaking, and is followed by finishing operations including baking/drying and cutting/folding. Digital thermal production involves no plates as a bench top electronic printer is driven directly by a host computer controlling the label design and the variable data to be printed. Thermal transfer is the most common technology employed. Ink is transferred from a carrier film onto the fabric where it dries immediately. Cutting and stacking operations are generally carried out on the printing machine itself, which opens up in-plant printing capabilities and thermal transfer service bureau locations. The disclosed system supports both service bureau production and in-plant printing for maximum supply chain flexibility, wherein vendors select the best option to suit their particular needs and circumstances. Thus, the blended solution provides maximum flexibility, global consistency, and is scalable for growth.

Data management is also flexible by transferring different file types received from retainers with purchase orders. For example, XML (extensible markup language) is preferred, but other file types can be used as well, such as fixed position text file (file contains fixed position field columns); text file with delimiter (delimiters include but are not limited to comma separated value (csv), tab, pipe, or ampersand); text file with header and variable detail relationship; and electronic data interchange (EDI). The disclosed system then runs common file transfer methods to check for files on a regular basis, such as applicability standard 2 (AS2) which ensures secured data exchange through HTTPs; file transfer protocol (FTP); secured file transfer protocol (SFTP); and value added network (VAN) wherein service is used to transfer EDI files and a charge is applied with byte rates according to VAN provider.

The disclosed system also provides a centralized online platform where vendors can submit complex trim orders quickly and accurately. The setup combines your data feed with our extensive care instruction, care symbol, and translation databases. The online platform also drives orders for all products, without variable data, to any service bureau or in-plant printing location. Further, the online platform gives RBO flexibility to make changes to variable data information late in the product lifecycle, and provides vendors with a variable data layout preview. There is also a dedicated CSR in each global location trained on account programs, to deal with expedites, split shipments, shipping rates, RBO sales, and order tracking.

The disclosed system and method provides a fully integrated end to end automation solution to meet the evolving and increasingly pressurized demands of multilingual care labeling. Specifically, the disclosed system and method leverages the data management system to automate as many fields as possible. The system also provides for online catalog or call out ordering to simplify order entry. Further, print files are created on demand from the latest data source, and label formats are centrally managed and updated to ensure data maps correctly. Additionally, print files are globally distributed for data integrity in any location, and a global service bureau is combined with in-plant print solutions for maximum supply chain flexibility.

Figure 4:
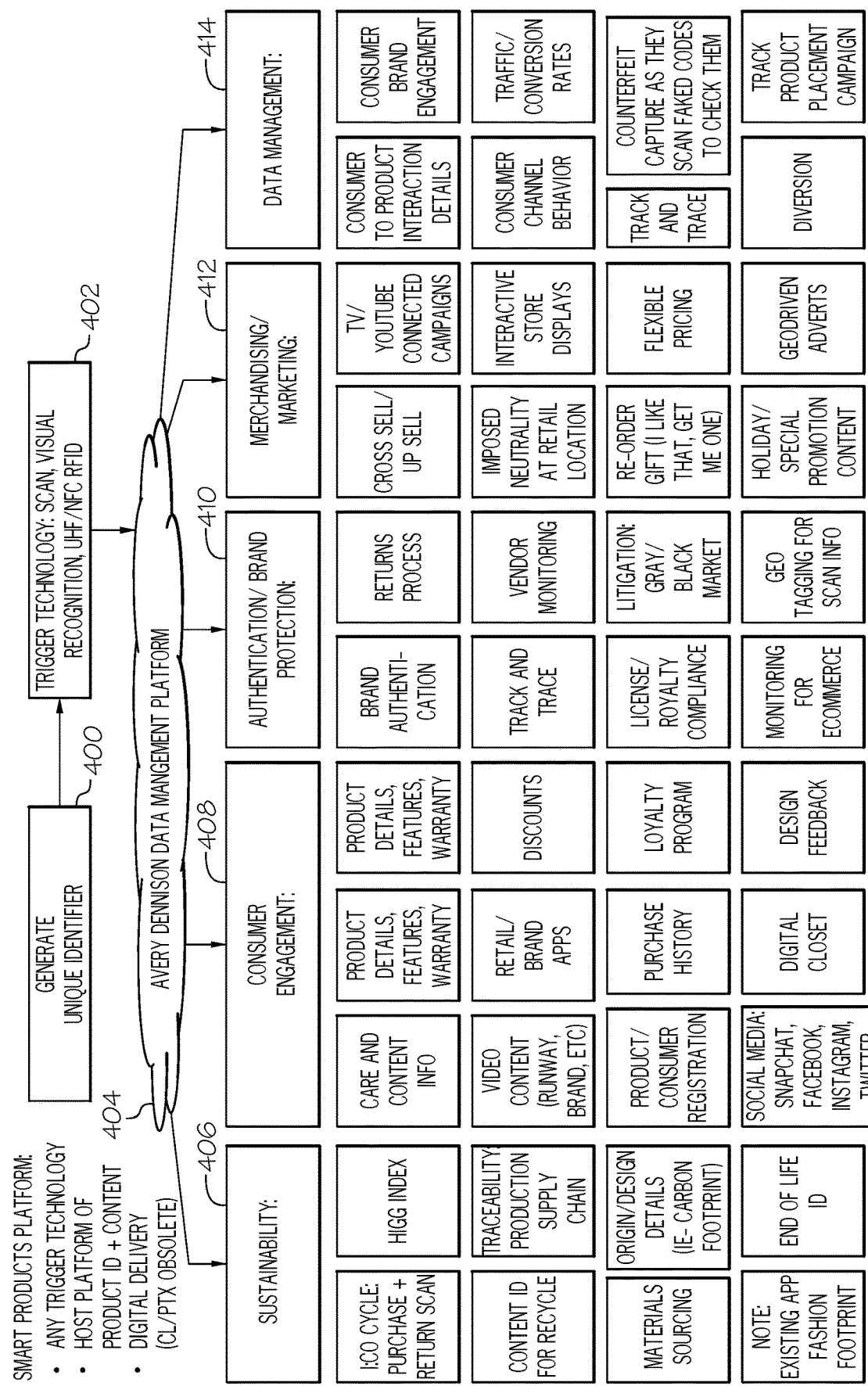
FIG. 4 illustrates a flowchart of the data management platform of the disclosed system in accordance with the disclosed architecture.

As shown in FIG. 4, an RFID transponder or other trigger technology is incorporated into a care label to effectively integrate RFID directly into the garment. The RFID transponder or trigger technology generates a unique identifier 400 for the garment or accessory. Thus, once the trigger technology 402 is enabled via scanning, visual recognition, UHF/NFC RFID, etc., items in the data management platform 404 are enabled via the unique identifier 400. Specifically, the items within the data management platform 404 include sustainability 406, consumer engagement 408, authentication/brand protection 410, merchandising/marketing 412, and data management 414.

Sustainability 406 includes I:CO Cycle 500 (purchase and return scan), content identification for recycling, materials sourcing, existing applications fashion footprint, HIGG index, traceability (production supply chain), origin/design details (carbon footprint), and end of life identification.

Figure 5:
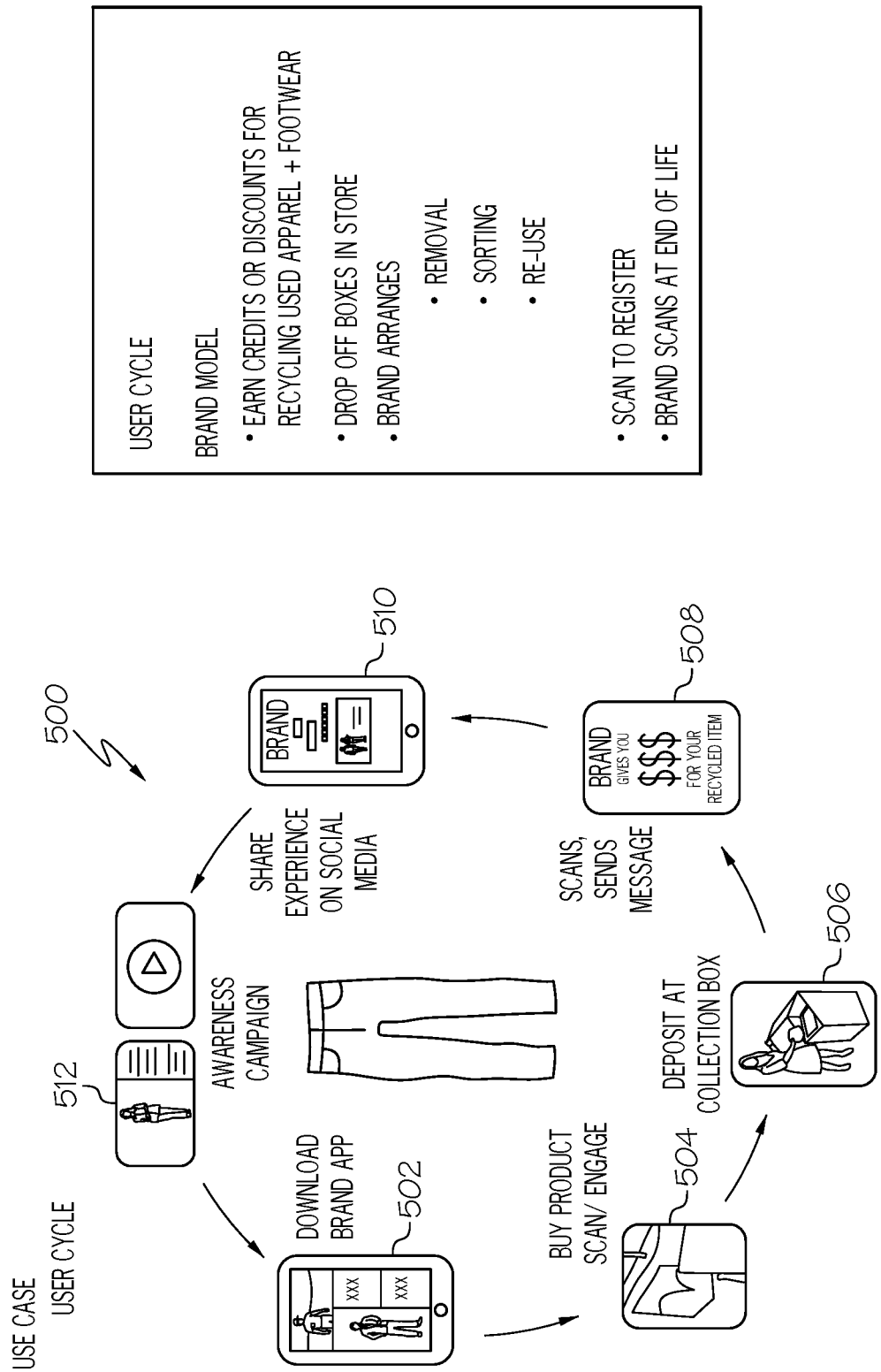
FIG. 5 illustrates a flowchart of the user cycle of the disclosed system in accordance with the disclosed architecture.

As shown in FIG. 5, the I:CO Cycle 500 system, available from I:CO which is pert of the SOEX GROUP, allows a user to earn credits or discounts for recycling used apparel and footwear by returning the apparel and footwear to drop boxes within the store. The I:CO Cycle arranges removal, sorting, and re-use of the donated apparel and footwear. A user would first download 502 the brand application on their mobile device. The user would then buy a product 504 (i.e., apparel or footwear), and would scan the RFID tag within the product to engage the application and to register the product with the application on the mobile device. When the user is ready to recycle (donate) the product, they deposit 506 the apparel or footwear at an I:CO collection box. The I:CO scans 508 the product (at end of life) and sends the user a coupon or other credit or discount via the application on the mobile device for recycling the used apparel and footwear. The user then shares 510 their experience on Social Media. These experiences can then be used by the Brand to create an awareness campaign 512.

Consumer Engagement 408 includes care and content information, video content (runway, brand, etc.), product/consumer registration, social media (i.e., Snapchat, Facebook, Instagram, Twitter), product details (i.e., features, warranty, etc.), retail/brand applications, purchase history, digital closet, discounts, loyalty program, and design feedback.

Figure 6:
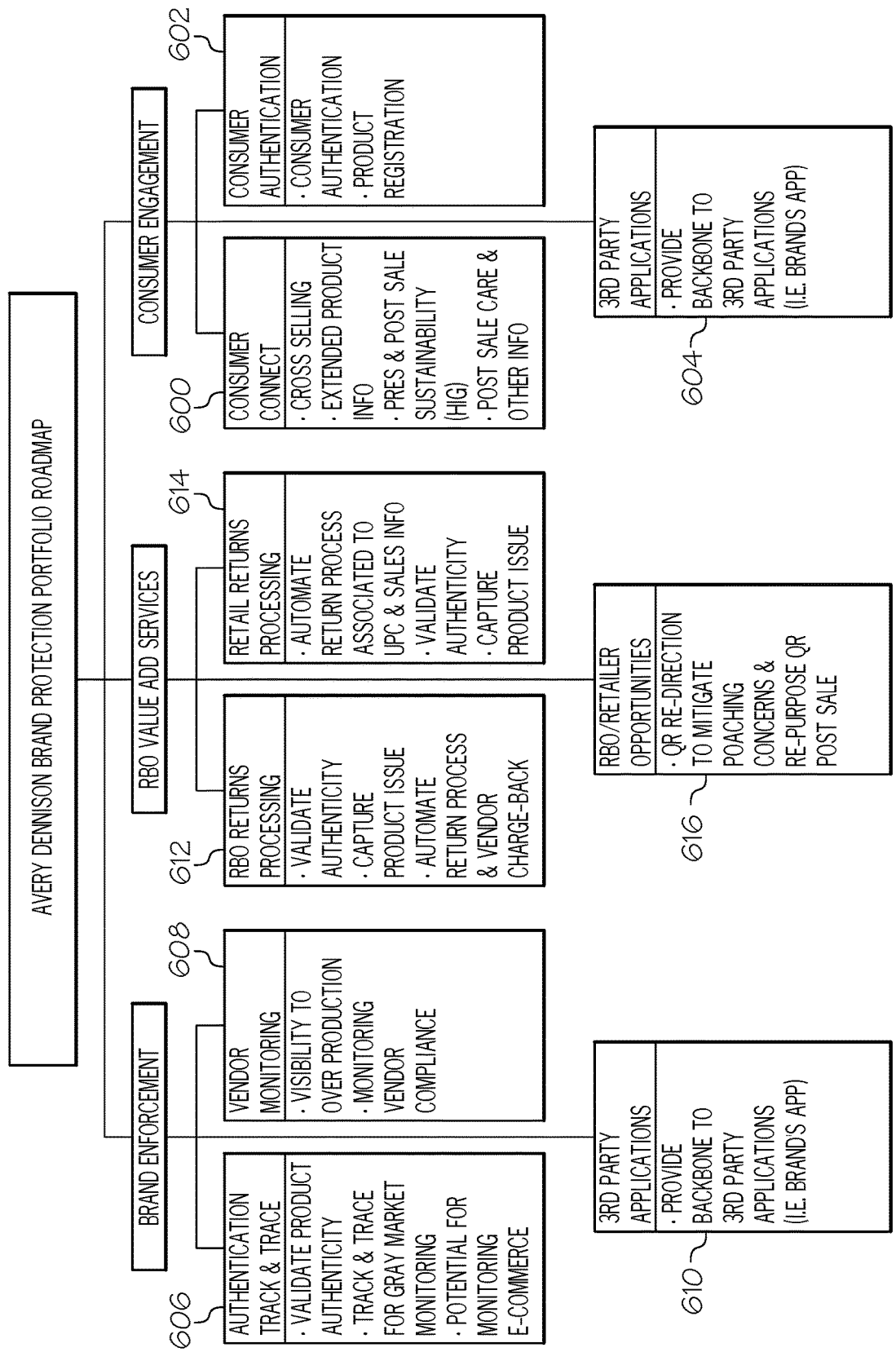
FIG. 6 illustrates a flowchart of the brand protection of the disclosed system in accordance with the disclosed architecture.

As shown in FIG. 6, Consumer Engagement can also include consumer connect functions 600, such as cross selling opportunities and extended product information. Cross selling opportunities link consumers with content specific information about the product using item level serialization tied to the disclosed database. Extended product information includes understanding what the consumer is looking at specifically, which provides the RBO with data allowing them to deliver extended product information about features and benefits, care information and special handling instructions, sustainability information, and any other pre or post sale information that will enhance the consumer loyalty to the RBO's product. Consumer Engagement also includes consumer authentication 602 and third party applications 604. Consumer authentication provides end to end supply chain visibility, allows RBO's to integrate into their own applications, and provides product registration which allows RBO's to learn more about their customers and other market information. Third party applications utilize the disclosed database as a backbone to other software developers' item level tracking solutions.

Authentication/Brand Protection 410 includes brand authentication, track and trace, license/royalty compliance, monitoring for E-commerce, returns process, vendor monitoring, litigation (gray/black market), and geo tagging for scan information.

Brand authentication can also include track and trace 606 which validates product authenticity, allows for track and trace for gray market monitoring, and brand protection in the e-commerce space. Vendor monitoring 608 provides visibility to overproduction and monitors vendor compliance. Third party applications 610 provide the disclosed brand protection database as the backbone to software developer item level tracking solutions, (as shown in FIG. 6).

Brand protection also includes RBO Value Add Services which provides RBO returns processing 612, retail returns processing 614, and RBO/retailer opportunities 616. RBO returns processing 612 validates authenticity and captures product issues by providing a mobile tool to help RBO's gather return data utilizing serialization tied to data contained in the disclosed database. Retail returns processing 614 provides automotive return processing utilizing serial numbers and associated data to confirm UPC and sales information for consumer returns, validates authenticity as well as invalid returns as a result of theft, and capture product issue by creating an application to facilitate an easier return process between the retailer's and their vendors. RBO/retailer opportunities 616 provide redirection of serialize QR codes pre and post sale by providing QR code management between brand and retail customer.

Merchandising/Marketing 412 includes cross sell/up sell, imposed neutrality at retail location, re-order gift, holiday/special promotion content, television/YouTube connected campaigns, interactive store displays, flexible pricing, and geo-driven adverts.

Data Management 414 includes consumer to product interaction details, consumer channel behavior, track and trace, diversion, consumer brand engagement, traffic/conversion rates, counterfeit capture as they scan fake codes to check them, and track product placement campaign and may include geotagging or other regional attribution.

Figure 7:
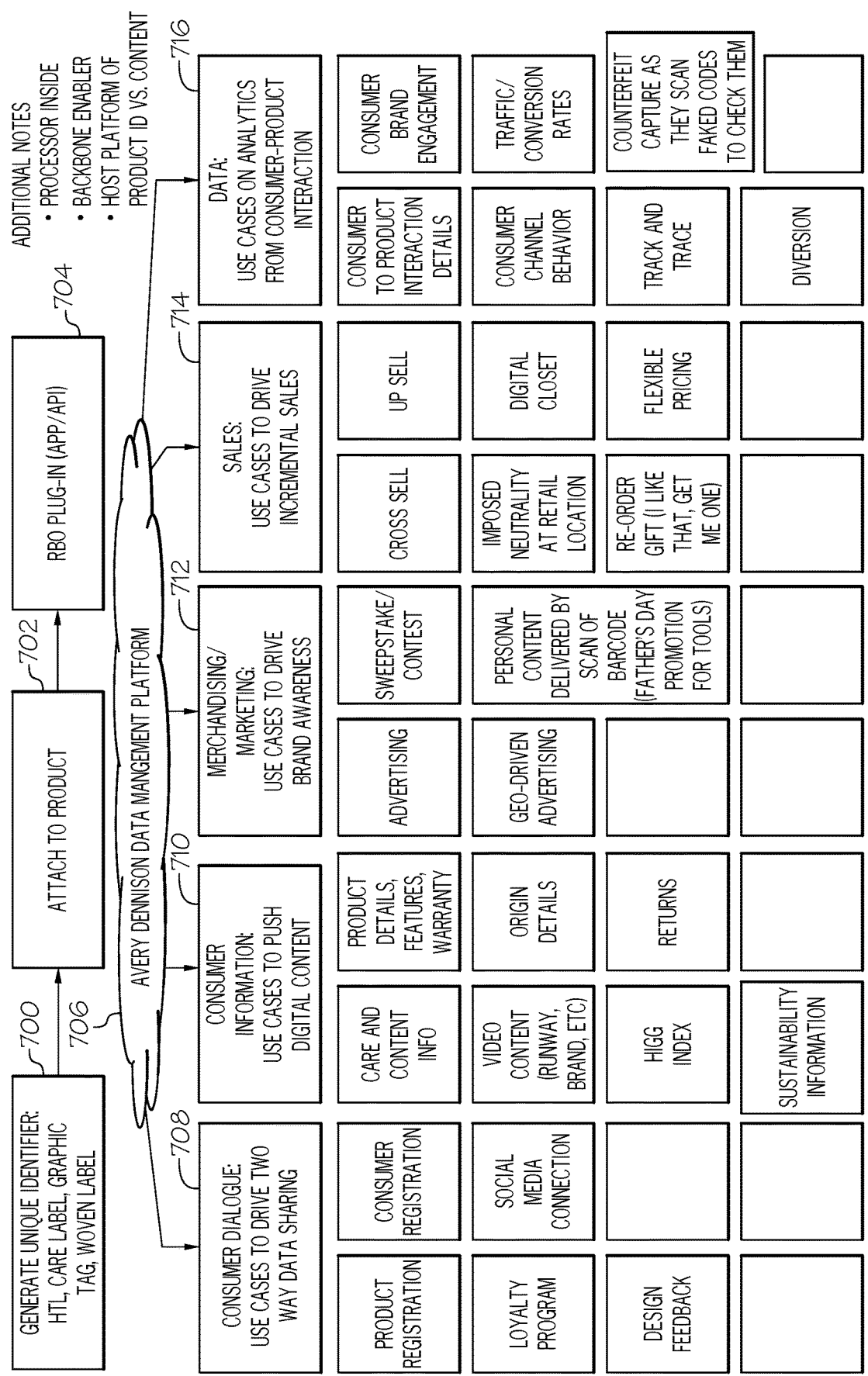
FIG. 7 illustrates a flowchart of the data management platform of the disclosed system in accordance with the disclosed architecture.

As shown in FIG. 7, a unique identifier 700 is generated via HTL, care label, hang tag, graphic tag, woven label, etc. and then attached to a product 702 and accessed via the RBO plug-in (an application/API) 704. The RBO plug-in then accesses the data management platform 706. Specifically, the items within the data management platform include consumer dialogue 708 (use cases to drive two way sharing), consumer information 710 (use cases to push digital content), merchandising/marketing 712 (use cases to drive brand awareness), sales 714 (use cases to drive incremental sales), and data 716 (uses cases on analytics from consumer-product interaction).

Consumer dialogue 708 includes product registration, loyalty program, design feedback, consumer registration, and social media connection.

Consumer information 710 includes care and content, video content (runway, brand, etc.), HIGG index, sustainability information, product details (i.e., features, warranty, etc.), origin details, and returns.

Merchandising/marketing 712 includes advertising, geo-driven advertising, sweepstake/contests, and personal content delivered by scan of barcode (i.e., Father's day promotion for tools, etc.).

Sales 714 includes cross selling, imposed neutrality at retail location, re-order gifts, up selling, cross selling, digital closet, and flexible pricing.

Data 716 includes consumer to product interaction details, consumer channel behavior track and trace, diversion, consumer brand engagement, traffic/conversion rates, and counterfeit capture as they scan faked codes to check them.

Additionally, the disclosed system utilizes a mobile application as a field authentication tool. The mobile application has investigation and reporting capability, as well as manual input and bar code scanning. The mobile application links the user to the secure database and validates the record being queried. The mobile application has the ability to append photographs and combine with data to create consolidated reports, and is iOS and Android compatible. Specifically, the mobile application activates the care label and/or hang tag via the electronic trigger (i.e., RFID, barcode, QR code, etc.), then authenticates the garment or accessories, and engages the user in consumer interactions.

The disclosed system allows objects to become information systems, and digital output is triggered by the unique connection of the connected products. Specifically, customers connect with the individual item via 2D barcode scan, RFID enabled displays, and other recognition technologies. Consumer interaction with the connected product elevates brand awareness and brand conversations for the in-store experience and post purchase engagement.

For example, the disclosed system brings "theater" to retail and is UHF RFID enabled. The system provides an in-store interactive experience which provides the ability to cross-sell and up-sell. The system allows a brand owner to tell their brand story, to gather intel on fitting room activity and customer preferences, and to provide a personalized interaction across all commerce.

The disclosed system enables consumer engagement via loyalty programs, product registration, cross-selling, consumer connectivity, wearable technology, item authentication, and on demand consumer information. Consumer information includes product characteristics, care and content, and HIGG index/sustainability. The loyalty program includes data collection, customer retention, cross-selling/up-selling, and consumer incentives. Consumer incentives include discounts/coupons, earning benefits/rewards, exclusivity/VIP status, and convenience benefits.

Consumer interaction includes stores that will know who they are, user preferences and purchase history while they are physically in the store; stores will know what product users are handling while in the store; stores will provide the same rich brand storytelling and social media integration now found online; and stores will let customers interact directly with in-store technology to receive personalized recommendations based on their historic preferences. This consumer interaction will increase traffic, basket size, and conversion rate. The disclosed system provides the ability to communicate personalized recommendations, services, and offers tailored to the customer's location and history while they are in the store. It also uses these recommendations, preferences, and purchase history to dynamically change recommendations, visual merchandising presentations, or promotions. For example, the store could be equipped with interactive touchscreens which would automatically recognize every item brought into the dressing rooms, and would allow customers to purchase the clothing they are trying on in different sizes, and to control the lighting inside the dressing room. The interactive touchscreens would also provide dynamically changing merchandise promotions depending on the customer's preferences and purchase history, and would offer the ability to browse through outfit combinations on the screen.

Figure 8:
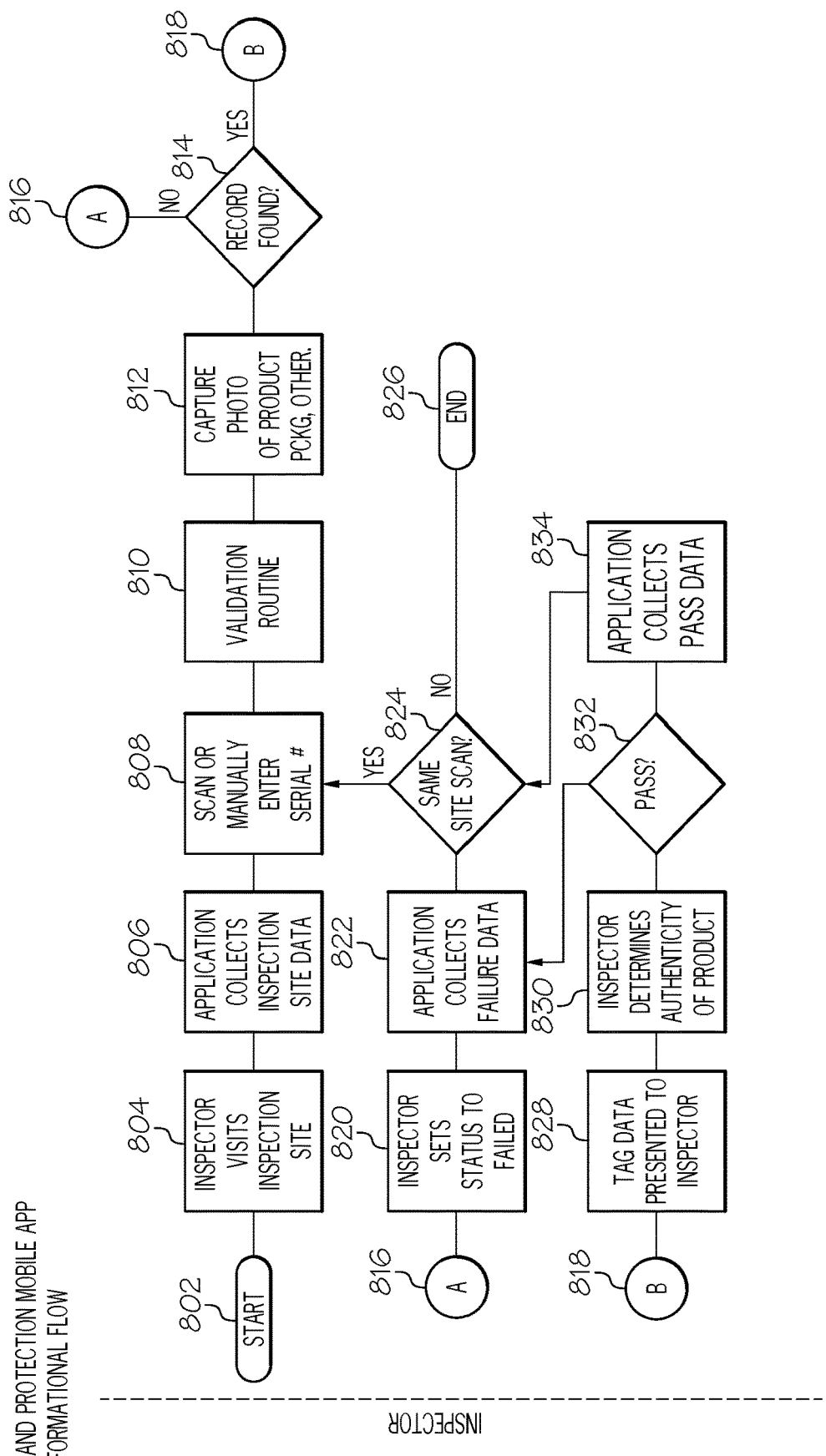
FIG. 8 illustrates a flowchart of the brand protection mobile application of the disclosed system in accordance with the disclosed architecture.

Furthermore, the mobile application would provide brand protection as shown in FIG. 8. At 802, the method starts. At 804, an inspector visits the inspection site. At 806, the mobile application collects inspection site data. At 808, the mobile application is used to scan or manually enter serial numbers. At 810, a validation routine is performed. At 812, a photo of the product, package, etc. is captured. At 814, it is determined if the record is found. If no, the method moves to 816, and if yes, the method moves to 818. If no at 816, then at 820 an inspector sets the status to failed. At 822, the mobile application collects failure data. At 824, it is determined if the same site is scanned. If no, then at 826 the method ends. If yes, then the method goes back to 808 and the validation routine is repeated. If at 814, it is determined that yes (818) a record is found, the method moves to 828 and tag data is presented to the inspector. At 830, the inspector determines authenticity of the product. At 832, it is determined if the product passes. If no, then the method goes back to 822 where failure data is collected and it is determined if the same site was scanned (824). If yes, then at 834 the mobile application collects pass data and the method goes back to 824 where it is again determined if the same site was scanned.

Figure 9:
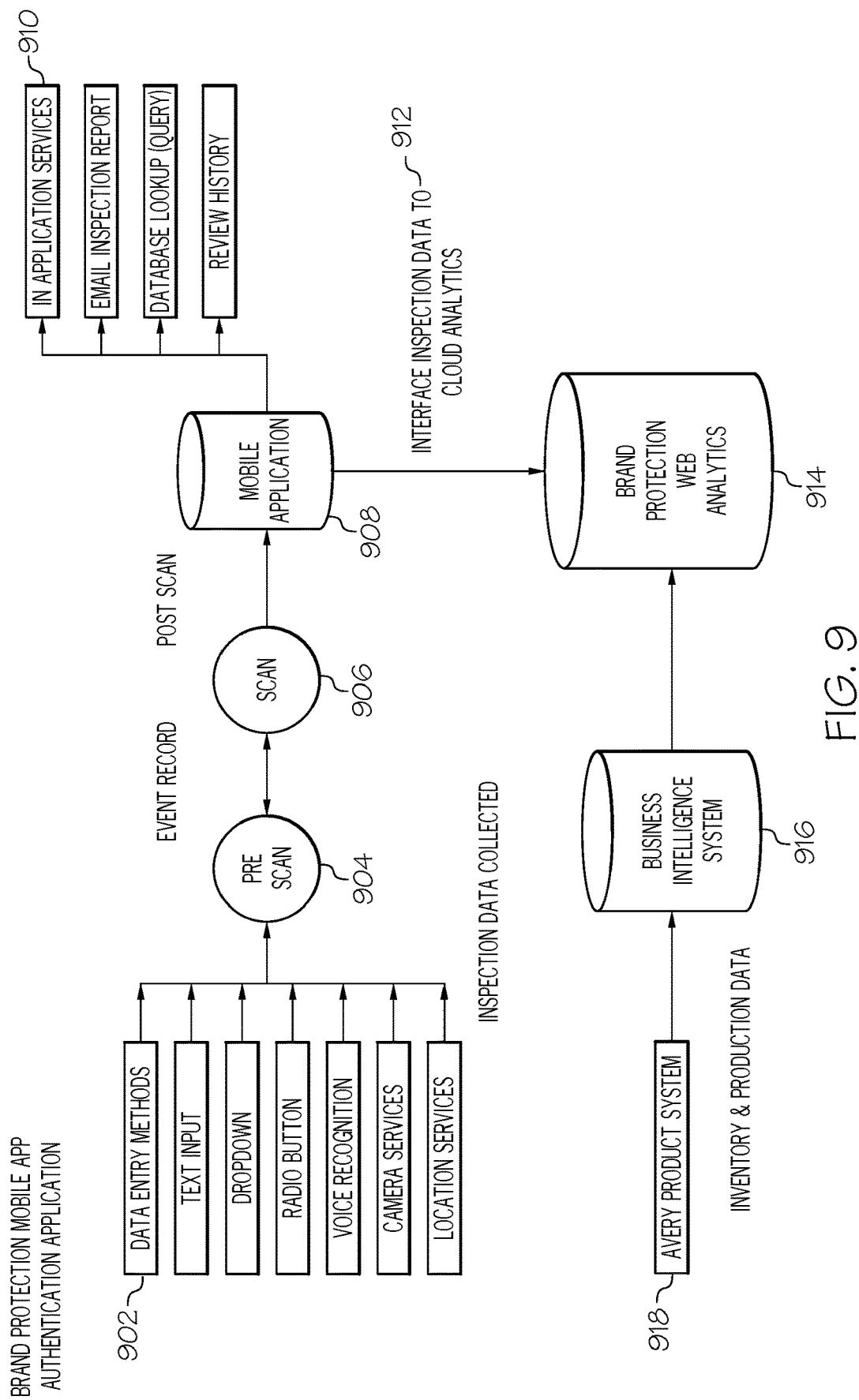
FIG. 9 illustrates a flowchart of the authentication application of the disclosed system in accordance with the disclosed architecture.

Additionally, the mobile application would provide authentication as shown in FIG. 9. At 902, the data entry methods are shown, such as text input, dropdown, radio button, voice recognition, camera services, and location services. Once the inspection data is collected via the data entry methods, a pre-scan occurs at 904. At 906, a scan occurs. The mobile application is activated at post scan 908. At 910, application services are activated, such as email inspection report, database lookup (query), and review history. At 912, the interface inspection data moves to cloud analytics. At 914, brand protection web analytics is activated via brand protection intelligence. Specifically, the business intelligence system 916 receives inventory and production data from the disclosed production system at 918.

Thus, the mobile application which is available on Android and iOS, provides seamless deployment of inspection data requirements (inspection services) and can email inspection reports instantly. The application also has the ability to capture store, garment, or packaging photographs; GPS location stored without user interruption; barcode serial numbers can be entered by text or voice; perform query of barcodes; review historic scans; scan 5 mm barcodes; multiple barcodes in preview; auto-next scan functionality; and tailor each service to recognize a single type of barcode. Furthermore, the application provides an on device backup where scans are saved on the device for validation later (i.e., during unstable internet connection). The application also creates export templates for inspection data, csv or weblink, and analyzes data on the disclosed brand protection analytics suite.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A hang tag or care label for a garment or accessory, comprising:
    embedded trigger technology with at least one embedded trigger embedded via a digital manufacturing process, and a unique identifier corresponding to the at least one embedded trigger;
    a data management platform having a business rules engine configured to select data items stored in the data management platform in which data items are enabled via the embedded trigger technology and the unique identifier; and
    a secure box to house inbound and outbound data for communicating with external printers.

2. The hang tag or care label of claim 1, wherein the embedded trigger technology comprises at least one of RFID, QR codes, Data Matrix or bar codes.

3. The hang tag or care label of claim 2, wherein the hang tag or care label enable a data connection via the embedded triggers.

4. The hang tag or care label of claim 1, wherein the embedded trigger technology is enabled via scanning, visual recognition, or UHF/NFC RFID.

5. The hang tag or care label of claim 4, wherein once the embedded trigger technology is enabled, the data items in the data management platform are enabled.

6. The hang tag or care label of claim 5, wherein the data items within the data management platform comprise sustainability, consumer engagement, authentication/brand protection, merchandising/marketing, and data management.

7. A system that allows objects to become information systems, comprising:
    a hang tag or care label with embedded trigger technology and a data management platform having data items stored in the data management platform such that the data management platform is accessed via the embedded trigger technology and the data items within the data management platform comprise sustainability, consumer engagement, authentication/brand protection, merchandising/marketing, and data management;
    a mobile application which is accessed via the embedded trigger technology,
    wherein the mobile application acts as a field authentication tool and links a user to a secure database and validates a record being queried; and
    a serialization manager configured to manage serialization for security for one or more digital manufacturing processes.

8. The system of claim 7, wherein the embedded trigger technology comprises at least one of RFID, QR codes, or bar codes.

9. The system of claim 8, wherein the mobile application appends photographs and combines data to create reports.

10. The system of claim 9, wherein the mobile application is iOS and Android compatible.

11. The system of claim 10, wherein the mobile application authenticates a garment or accessories, and engages the user in consumer interactions.

12. The system of claim 11, wherein consumer interactions include a store knowing a user's preferences and purchase history; knowing what product a user is handling while in the store; providing social media integration; and letting customers interact directly with in-store technology to receive personalized recommendations based on their historic preferences.

13. The hang tag or care label of claim 1, wherein the digital manufacturing process comprises a thermal transfer process, a heat transfer process, a digital printing process, a laser etching process, or an ink jet printing process.

* * * * *